United States Patent
Garg et al.

(10) Patent No.: US 8,145,630 B1
(45) Date of Patent: Mar. 27, 2012

(54) SESSION-BASED DYNAMIC SEARCH SNIPPETS

(75) Inventors: Ashutosh Garg, Sunnyvale, CA (US); Kedar Dhamdhere, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 399 days.

(21) Appl. No.: 11/966,613

(22) Filed: Dec. 28, 2007

(51) Int. Cl.
*G06F 7/00* (2006.01)
*G06F 17/30* (2006.01)
(52) U.S. Cl. .......... 707/722; 707/736
(58) Field of Classification Search .......... None
See application file for complete search history.

(56) References Cited

U.S. PATENT DOCUMENTS

| | | | |
|---|---|---|---|
| 6,581,056 B1 * | 6/2003 | Rao | 1/1 |
| 7,305,389 B2 * | 12/2007 | Zeng et al. | 1/1 |
| 7,475,063 B2 * | 1/2009 | Datta et al. | 1/1 |
| 7,512,601 B2 * | 3/2009 | Cucerzan et al. | 1/1 |
| 7,548,913 B2 * | 6/2009 | Ekberg et al. | 1/1 |
| 7,610,282 B1 * | 10/2009 | Datar et al. | 1/1 |
| 7,617,176 B2 * | 11/2009 | Zeng et al. | 1/1 |
| 2005/0273388 A1 * | 12/2005 | Roetter | 705/14 |
| 2008/0215416 A1 * | 9/2008 | Ismalon | 705/10 |

* cited by examiner

*Primary Examiner* — Fred I Ehichioya
*Assistant Examiner* — Loan T Nguyen
(74) *Attorney, Agent, or Firm* — Fish & Richardson P.C.

(57) ABSTRACT

A first set of search results responsive to a first query during a search session is identified. A snippet is identified for each search result related to the first query. The snippet can be selected based on the location the search tokens from the query in the search result. A second set of search results responsive to a second query during a search session is identified. Repetitive search results can be identified. A second snippet for the repetitive search result is identified. The second snippet can be selected based on the location of the second search tokens in the repetitive search result and the content of the first snippet.

16 Claims, 5 Drawing Sheets

SESSION-BASED DYNAMIC SEARCH SNIPPETS

BACKGROUND

This document relates to Session-Based Dynamic Search Snippets.

The rise of the Internet has enabled access to a wide variety of content, e.g., video and/or audio files, web pages for particular subjects, news articles, etc. Content of interest to a user can be identified by a search engine in response to a user query. The user query can include one or more search terms or phrases, and the search engine can identify and rank results related to the user query based on the search terms or phrases in the query. The search engine can present the identified and ranked results items to the user. The search engine can also present a snippet about each result that is returned in response to the query based upon the content associated with the result. Often a user may read the snippet presented by the search engine before deciding whether to select the search result.

SUMMARY

In general, one aspect of the subject matter disclosed in this specification can be embodied in a method for dynamic snippet generation. A first set of search results responsive to a first query during a search session is identified. The first query includes one or more first search tokens. A snippet is identified for each search result related to the first query. The snippet for each search result is selected based on the location the search tokens from the query in the search result. A second set of search results responsive to a second query during a search session is identified. Repetitive search results are identified, wherein each repetitive search result is a search result in both the first set of search results and the second set of search results. A second snippet for the repetitive search result is identified. The second snippet is based on the location of the second search tokens in the repetitive search result and the content of the first snippet associated with the repetitive search result that was identified in response to the first query.

In another implementation, a current search query is received during a search session. A set of current search results responsive to the current search query is identified. The set of current search results is compared to a set of previous search results, the set of previous search results responsive to a previous query during the search session. A repetitive search result is identified from the set of current search results. The repetitive search result is a search result in the set of current search results and in the set of previous search results. A current search snippet for the repetitive search result is generated based on the current search query. The current search snippet is based on the repetitive search result and the content of a previous search snippet associated with the repetitive search result that was identified in response to the previous query.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Snippets can be a block of text from search results responsive to a query during the session that provide the user with a preview of the search result. Dynamic session snippets are snippets that can be modified during a session based on previous queries during the session. For example, if a snippet is shown to a user during a previous search within the same session, and continued the search session, it can be an indication that the user did not find the snippet helpful or did not find the desired results at the link associated with the snippet. Dynamic session snippets therefore can be modified during the search session to prevent the same search snippet from being presented with a repetitive search result during the search session.

Figure 1:
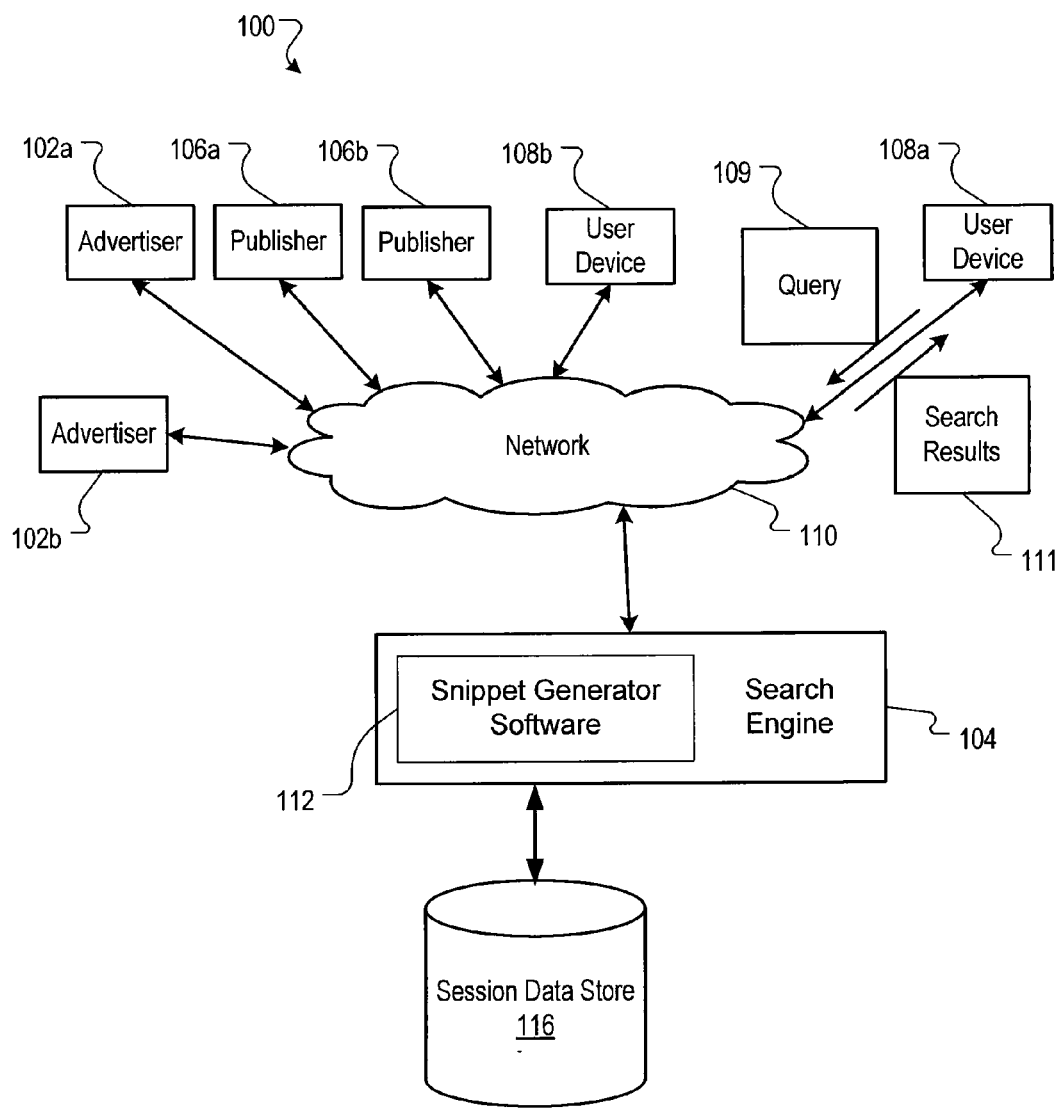
FIG. 1 is a block diagram of an example online environment.

FIG. 1 is a block diagram of an example online environment 100. The online environment 100 can facilitate the identification and serving of content items, e.g., web pages, advertisements, etc., to users. In some implementations, a computer network 110, such as, for example, a local area network (LAN), wide area network (WAN), the Internet, or a combination thereof, can connect advertisers 102a and 102b, a search engine 104, publishers 106a and 106b, and user devices 108a and 108b. Example user devices 108 can include personal computers, mobile communication devices, television set-top boxes, etc. Although only two advertisers (102a and 102b), two publishers (106a and 106b) and two user devices (108a and 108b) are shown in the example of FIG. 1, the online environment 100 can include only one or many thousands of advertisers, publishers and user devices.

§1.0 Content Search Processing

The publishers 106a and 106b can include general content servers that receive requests for content (e.g., web pages or documents related to articles, discussion threads, music, video, graphics, other web page listings, information feeds, product reviews, etc.), and retrieve the requested content in response to the request. For example, content servers related to news content providers, retailers, independent blogs, social network sites, products for sale, or any other entity that provides content over the network 110 can be provided by a publisher 106a, 106b.

In some implementations, a user device, such as user device 108a, can submit a query 109 to the search engine 104. The search engine 104 can provide search results 111 related to the query 109 to the user device 108a in response to the query 109. The search results 111 can include a link to web pages provided by the publishers 106a and 106b.

In some implementations, the query 109 can include one or more search tokens. A search token is a word or group of words submitted as part of a search query through a search engine that are used to retrieve responsive search results. For example, the search query "Atlanta pirates" includes the search tokens "Atlanta" and "pirates."

To facilitate identification of the search results responsive to queries, the search engine 104 can index the content provided by the publishers 106 (e.g., an index of web pages) for searches. The index can facilitate the retrieval of search results that are relevant to the query 109. An exemplary search engine 104 is described in S. Brin and L. Page, "The Anatomy of a Large-Scale Hypertextual Search Engine," Seventh International World Wide Web Conference, Brisbane, Australia (1998) and in U.S. Pat. No. 6,285,999, which is incorporated in its entirety herein. A search results page for presentation to a user can include, for example, lists of web page titles extracted from web pages identified by the search results, snippets of text extracted from the respective web pages, and hypertext links to the respective web pages. The search results presented on the search results page can be grouped into a predetermined number of search results (e.g., ten).

The snippets of text extracted from the search results provide the user with a preview of the search result and can illustrate the relationship of an associated web page to the search tokens. The snippet can be a block of text from the search result that includes at least one of the search tokens in the query. The snippet can include a portion of the text occurring before, after, and/or between search tokens. In some implementations, the initial method of extracting the snippet is based on identifying content associated with a search result that includes the search tokens from the query.

In some implementations, if multiple snippets in the search result include the search tokens from the query, other criteria can be used to select the snippet. For example, such criteria can include the location of the snippet within the search result, the proximity of the search tokens to each other, token frequency, etc. For example, there are multiple snippets of text that include the search tokens "Atlanta" and "pirates" in a web page dedicated to the local "Atlanta Pirates" soccer team. In some implementations, a snippet that is found in the title or header of the web page might be favored over a snippet found in a caption or in a footnote on the web page. Other methods of identifying the initial search snippet for the search result can be used.

In some implementations, the search engine 104 can derive a relevance score for each search result and rank the search results 111 according to the relevance scores. In such implementations, the relevance scores can be based on an information retrieval (IR) score that measures the relevance of a query to the web page documents. In some examples, the IR scores can be computed from dot products of feature vectors corresponding to the query and content of a web page.

In other implementations, the IR scores can be combined with other data related to the web pages to generate the relevancy scores. For example, Page Rank scores of the web pages (e.g., scores associated with the quality of web pages as measured by the number of other sites linking to the web pages) can be combined with the IR scores to generate the relevancy scores. Other algorithms and processes for identifying and ranking search results can also be used.

§1.1 Repetitive Search Results During A Search Session

In some instances, the content items identified by the search results may not satisfy the user's interests. Thus, the user might submit more than one query 109 to the search engine 104 during a search session. Because the queries 109 during a search session are often related to each other, similar search results 111 might be identified in response to similar queries 109 during the same session. For example, a user searching for content items related to the local soccer team, the Atlanta Pirates, may first submit a query for "pirate soccer." In this example, the first query could be immediately followed by a query for "Atlanta soccer schedule." Both queries may return the web page dedicated to the Atlanta Pirates soccer team, e.g. Atlanta Pirate Soccer Online. Such a page is a repetitive search results because the web page is responsive to both of the queries associated with the search session.

The search engine 104 can log the search results 111 for each query 109 in a search session. In some implementations, the user queries 109 and corresponding search results 111 can be stored in a session search results data store 116. The session search results data store 116 can store, for example, a set of ranked search results 111 for each query 109; or can alternatively store crawled web pages that are ranked by their respective relevance for each query 109. Other data structures can also be used to store queries 109 and/or search results 111 for search sessions.

In some implementations, a search session can be defined by a period of time between queries. For example, if a particular user device 108a enters a query, a current search session can be initiated. The current search session can be terminated when the search engine 104 has not received further queries from the user for a preset period of time (e.g., 5-10 minutes). In other implementations, the search session can be defined by a user indicating the beginning and end of a search session (e.g., by logging into a search engine interface of the search engine 104 and logging out of a search engine interface). In still further implementations, the search session can be defined by a relationship between a newly received search query and previously received search queries from the same user. Other methods can be used to identify and track search sessions.

§1.2 Dynamic Generation or Snippets

In some implementations, the search engine 104 can include a snippet generator software 112 that dynamically generates snippets for repetitive search results. The search engine 104 and/or the snippet generator software 112 can identify repetitive search results during a search session, for example, by comparing the current results to stored previous results associated with the search session. For the repetitive search results, the search engine 104 and/or the snippet generator software 112 identify snippets that do not contain content that was previously presented as part of a previous snippet for the repetitive search result in response to a previous query.

The search engine 104 and the snippet generator software 112 can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. The search engine 104 and the snippet generator software 112 can be implemented separately, or can be implemented as a single software entity. The search engine 104 and the snippet generator software 112 can also be distributively implemented over a network, such as a server farm, or can be implemented in a single computer device.

§2.0 Examples of Identification of Snippets

Figure 2:
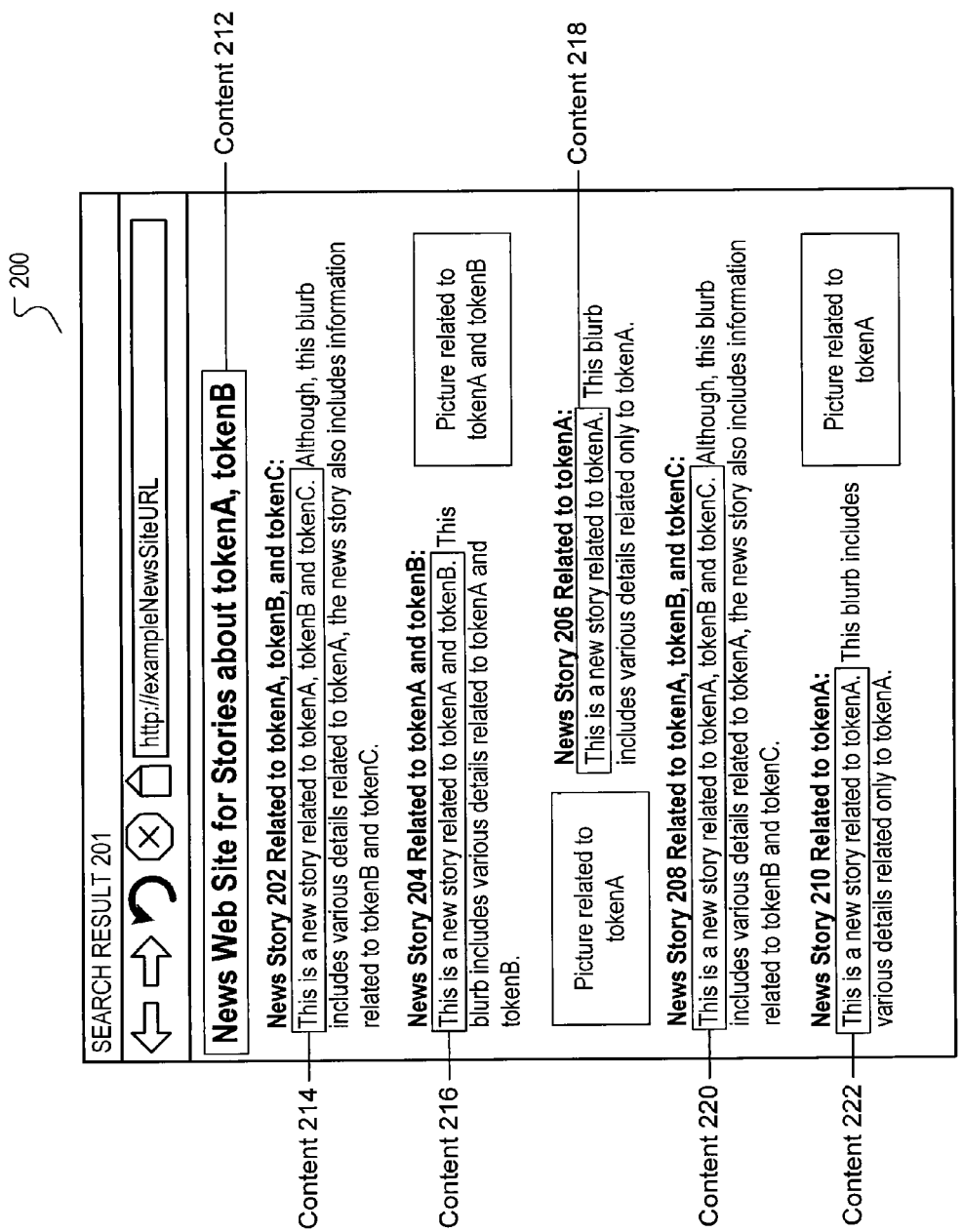
FIG. 2 is an example screen shot of a search result.

FIG. 2 is an example screen shot 200 of a search result 201. The screen shot 200 depicts snippets from the search result 201. The snippets identified in the screen shot can, for example, be areas of text that include the search tokens submitted as part of a query. The search snippets can be presented with the search results to identify the relationship between the search result and the query.

The search result 201 can be a web page associated with a search result returned in response to a query. In some implementations, the search result 201 was returned in response to the query because the web page includes one or more of the search tokens submitted as part of the query. When a user searches for the search tokens included in the web page associated with the search result, the search result can be returned as responsive to the query. For example, the search result 201 is a web page dedicated to the local soccer team, the Atlanta Pirates. The Atlanta Pirates web page might be updated frequently with news stories of the Atlanta Pirates' soccer matches. Thus, queries including different combinations of the search tokens "Atlanta," "pirates" and "soccer" often return the Atlanta Pirates web page as a responsive search result.

The screen shot 200 of the search result 201 identifies potential content that can be extracted from the search result 201 as the snippet for the search result. Different methods can be used to identify the initial snippet from the search result 201. In some implementations, snippets include the text surrounding the search tokens. If multiple pieces of content within the search result include the search tokens, then the content for the snippet can be selected based on the location of the content within the search result. The method of selection of a snippet from the search result 201 can be modified if the search result is a repetitive search result.

For example, where the search snippet is based on the search tokens from the query, each of content 212, 214, 216, 218, 220 and 222 are potential content for the search result 201 because each of the contents includes the tokenA from the query. The snippet is selected from the contents 212-222 based on the location of the content. Because the content 212 is also the first header of the search result, then the content 212 is selected as the search snippet for the search result 201. For example, if a header at the top of the web page was "News Stories for the Atlanta Pirates Soccer Team," that header would be presented as the snippet for the web page dedicated to the Atlanta Pirates where the search was for "Atlanta pirates." Other methods of identifying the initial search snippet for the search result can be used.

However, if the search result returned is a repetitive search result returned during the search session, in some implementations, the initial method of identifying a search snippet can be modified so that content different than provided in a previous snippet can be used to generate a current snippet. Other potential content 214-222 that include the search tokens from the query can be considered. Such other potential content can be selected as the snippet for the search result 201, based on the location of the content within the search result or based upon the location of the token within the content.

For example, if a user enters a current query for "Atlanta soccer" during the same session that the user previously queried for "Atlanta pirates," a web page dedicated to the Atlanta Pirates can be returned in response to the current query with a different snippet than the snippet returned in response to the previous query. Although the title of the web page, content 212, may be identified as potential content for the snippet, because the title was already presented as the previous search snippet for the web page in response to the query for "Atlanta pirates," different content can be used for the current snippet. In one example, content 214, the title of the first news story can be returned as a snippet for the search result.

In some implementations, a potential content for a snippet from a search result that includes repeated text from a previous search snippet for that search result is not included in the current search snippet. Repeated text can be text that has already appeared in previous search snippets for the search result during the search session. In some implementations, repeated text can include text from the search result that has a similar composition of words as the text from the previous search snippet; the repeated text might not be limited to the actual content that was used for the previous search snippet. In such implementations, because the repeated text is analogous to the text from the previous search snippet, the repeated text can be excluded from selection as the current search snippet.

For example, if the content 216 included the previously presented snippet "Your #1 source for news stories for the Atlanta Pirates Soccer team," then any other content that has a similar composition of words as content 212 ("News Stories for the Atlanta Pirates Soccer Team") can be excluded from consideration for the current search snippet. The content 216 is repeated text because similar content 212 was previously presented as the search snippet for Atlanta Pirate Soccer Online when the web page was responsive to a previous query for "Atlanta pirates." Thus, if the user submits a third query for "pirates soccer," during the same session as the user queries for "Atlanta pirates," neither content 212 nor content 216 would be selected as the search snippet for the search result 201 based on the repeated text in the content.

In some implementations, previously presented snippets can be eliminated from consideration for current snippets. In other implementations, previously presented snippets can be weighted making it more unlikely that a previously presented search snippets will be presented to the user multiple times. In such implementations, the content for the current search snippet is selected from the potential content based on weights assigned to each of the potential snippets. The potential snippets can be assigned weights that measure different criteria of each snippet. For example, one criterion upon which a potential snippet can be weighted is the number of search tokens found in the potential snippet. The potential snippet content that has each of the search tokens found within it will be assigned a higher weight than one than a potential snippet content that includes only a subset of the search tokens. Another criterion that can be weighted is the location of the potential snippet content within the web page. The potential snippet content that is located in the title or the header of the search result will have a higher weight assigned to it than the potential snippet content found at the end of the search result, or in a picture caption on the search result. The potential snippet content with the highest aggregate weight can be the content that is selected as the search snippet.

In such implementations, an additional criterion that can be weighted is whether the potential snippet content has previously been included in a search snippet during the current session. Potential snippet content that was included in a previously presented search snippet can be assigned a negative weight. Thus, content associated with previously presented snippets will be less likely to be selected based upon the negative weighting assigned to such content. The potential snippet content with the highest aggregate weight can still be the content selected as the search snippet. Thus, a previously presented snippet can be selected as the current search snippet if the aggregate weighting of the snippet is greater than the weighting of other potential snippet content.

For example, the content 212 can receive the highest weight in response to a previous query for "Atlanta pirates." A current query might include "Atlanta soccer," which includes the same results as the previous query for "Atlanta pirates." The content 212 might have previously received the highest weighting because the content 212 includes all three search tokens, and is located in the first header on the web page Atlanta Pirate Soccer Online. The content 214 might have previously received the second highest weighting in response to the same search, because the content 214 also includes all the search tokens and is only a little lower than the content 212. However, because the previous search snippet for Atlanta Pirate Soccer Online in response to the query for "Atlanta pirates" was extracted form the content 212, the content 212 is negatively weighted when selecting the a search snippet for the current query "Atlanta soccer." Thus, the content 214 is selected as the highest weighted potential content, and the selected search snippet for Atlanta Pirate Soccer Online site includes content 214.

§3.0 Screen Shots of a Set of Search Results

Figure 3:
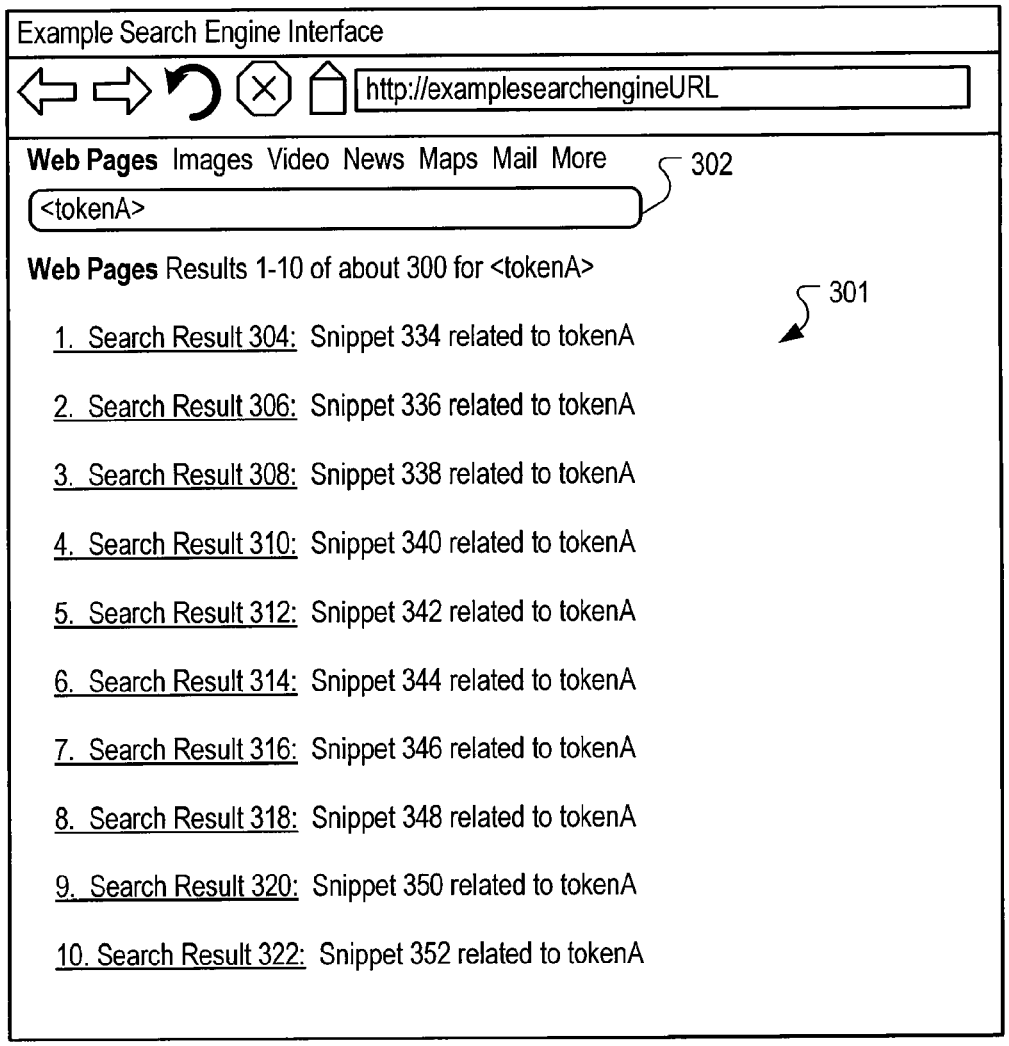
FIG. 3 is an example screen shot of a set of first search results.

FIG. 3 is an example screen shot 300 of a set of first search results 301. The search results 301 are responsive to a first query, e.g. the query 302 for "tokenA" as listed in the query edit box. The search results in the set of search results 301 can be presented with a snippet providing a short description of the search results. In some implementations, the snippet can identify the relationship between the search result and the query.

For example, a user searching for the soccer team, the Atlanta Pirates, can submit a query for "Atlanta pirates." Search result 310, the official home page for the Atlanta Pirates, can be one of the search results returned in response to the query for "Atlanta pirates." A snippet 340 from the header of the home page can be presented with the search result:

The official home page of the Atlanta Pirates. The soccer fan's first source for team pictures, schedules, and other Atlanta Pirate information.

In this example, snippet 334 may have been selected because it contains both search tokens from the query 302 (e.g., "Atlanta" and "pirates"), and the search tokens are in the header of the home page.

Figure 4:
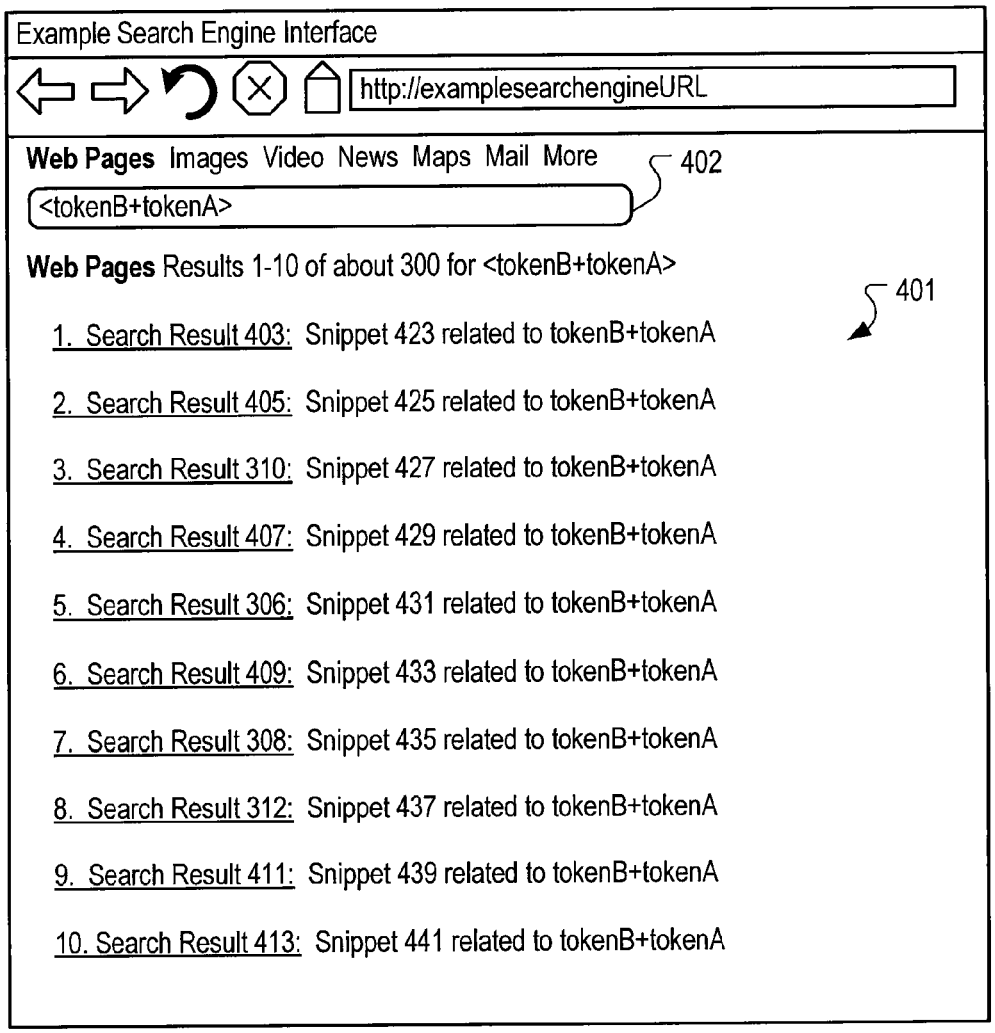
FIG. 4 is an example screen shot of a set of second search results.

FIG. 4 is an example screen shot 400 of a set of second results 401. The search results 401 are responsive to a second query, e.g. the query 402 "tokenB+tokenA" as listed in the query edit box. The search results in the set of search results 401 can be presented with snippets providing a short description of the result. In some implementations, the snippets can identify the relationship between the search result and the query 402. However, the snippets selected for search results which have been previously presented to the user, e.g. snippet 427 for the search result 310, can be dynamically generated. Dynamically generated snippets can include different content than the previous search snippets presented with the search results previously presented to the user.

For example, in the same search session where the user submitted a previous query for "Atlanta pirates," the user could submit a query for "Atlanta soccer schedule" as a current query 402. The web page for the Atlanta Pirates can be returned as a search result responsive to the query 402. However, since the Atlanta Pirates web page is a repetitive search result that was returned in response to a previous query for "Atlanta pirates," the snippet for the search result can be dynamically generated so as to be different than the snippet presented previously with the web page. The snippet 427 can be presented with the search result 310, and can be selected from the body of the home page:

Check this page daily for updates and modifications to the schedule of the Pirates, the official soccer team of Atlanta.

In this example, the snippet 427 was selected instead of the snippet 340 because the snippet 340 was previously presented with the search result 310 (e.g., as a result to a previous query) during the search session.

§4.0 Example Dynamic Snippet Generation Process Flow

Figure 5:
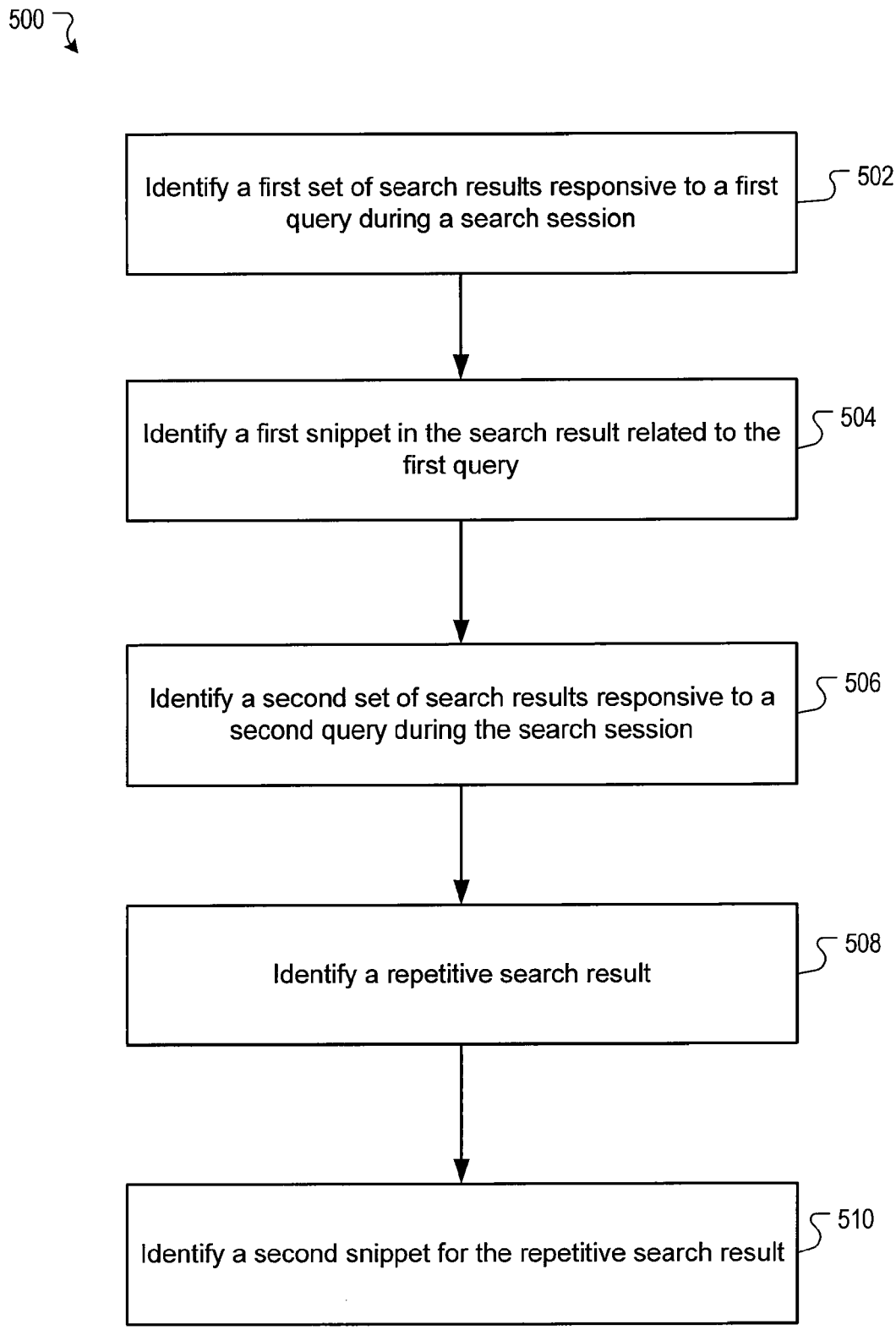
FIG. 5 is a flow diagram of an example dynamic snippet generation process

FIG. 5 is a flow diagram of an example dynamic snippet generation process 500. In various implementations, the process 500 can be implemented in the search engine 104 of FIG. 1 and/or by the snippet generator software 112 of the search engine 104. Other implementations are possible.

The process 500 can identify a first set of search results responsive to a first query during a search session (502). In some implementations, the search engine 104 of FIG. 1 and/or the snippet generator software 112 of the search engine 104 can identify a first set of search results responsive to a first query. For example, if the search query was "Atlanta pirates," the search engine can identify search results for "Atlanta pirates." Included in the search results is the web page for the Atlanta Pirates soccer club, Atlanta Pirate Soccer Online.

The process 500 can identify a first snippet in the search result related to the first query (504). In some implementations, the search engine 104 of FIG. 1 and/or the snippet generator software 112 of the search engine 104 can identify a first snippet from the search result related to the first query. The first snippet can be based, for example, on the inclusion of the search tokens and/or the location(s) of the search tokens within a web page. For example, if the search tokens are "Atlanta" and "pirate," content from the Atlanta Pirate Soccer Online web page that includes the search tokens can be selected as the snippet for the search result. If the title of the web page is Atlanta Pirate Soccer Online, that title can be selected as the snippet for the search result.

The process 500 can identify a second set of search results responsive to a second query during the search session (506). In some implementations, the search engine 104 of FIG. 1 and/or the snippet generator software 112 of the search engine 104 can identify a second set of search results responsive to a second query. For example, the user can enter a second query for "Atlanta soccer." Responsive to the search query are various search results that include the search tokens "Atlanta" and "soccer." The search results can include the web page of the Atlanta Pirates soccer club.

The process 500 can identify a repetitive search result (508). In some implementations, the search engine 104 of FIG. 1 and/or the snippet generator software 112 of the search engine 104 can identify a repetitive search result. For example, the search results identified in response to both the query for "Atlanta pirates" and the query for "Atlanta soccer" both included the web page of the Atlanta Pirates soccer club. Thus, the home page for the Atlanta Pirates soccer club, Atlanta Pirate Soccer Online, is considered a repetitive search result because it is found in both sets of search results.

The process 500 can identify a second snippet for the repetitive search result (510). In some implementations, the search engine 104 of FIG. 1 and/or the snippet generator software 112 of the search engine 104 can identify a second snippet for the repetitive search result. The second snippet, for example, can be based on the location of the search tokens in the repetitive search result and the content of the first snippet associated with the repetitive search result. In the previous example, the first snippet for the repetitive search result was identified at stage 504 as the title of the search result, Atlanta Pirate Soccer Online. The second snippet can be identified by selecting content in the same manner as in stage 504, except the title can be excluded since it was previously used as a snippet for a previously presented search result. Thus, an area of text in the body that includes "Your #1 source for news stories for the Atlanta Pirates Soccer team" or another area of text within the web page can be selected as the second snippet for the repetitive search result.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, e.g., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal, that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method for generating search result snippets, comprising:
   identifying a first set of search results responsive to a first query during a search session, the first query including one or more first search tokens;
   for each search result in the first set of search results, identifying a first snippet in content referred to by the search result, the first snippet selected based on a location of the one or more first search tokens of the first query in the content referred to by the search result;
   identifying a second set of search results responsive to a different second query during the search session, the second query including one or more second search tokens;
   identifying a repetitive search result that is a search result for both the first query and the second query during the search session, wherein the repetitive search result was not selected in the first set of search results; and
   selecting a second snippet from a plurality of different snippets in content referred to by the repetitive search result wherein the second snippet is different from the identified first snippet for the repetitive search result, and wherein the second snippet is selected based at least partly on an associated weight that is determined from a location of the second snippet in content referred to by the repetitive search result.

2. The method of claim 1, wherein at least one of the second search tokens from the second query is different from one of the first search tokens from the first query.

3. The method of claim 1, wherein the first snippet is an area of text in the content referred to by the repetitive search result surrounding the one or more first search tokens.

4. The method of claim 1; wherein the associated weight is also based on a number of the second search tokens that occur in the second snippet.

5. A machine-readable storage device including a program product having stored instructions executable by data processing apparatus to cause the data processing apparatus to perform operations comprising:
   identifying a first set of search results responsive to a first query during a search session, the first query including one or more first search tokens;
   for each search result in the first set of search results, identifying a first snippet in content referred to by the search result, the first snippet selected based on a location of the one or more first search tokens of the first query in the content referred to by the search result;
   identifying a second set of search results responsive to a different second query during the search session, the second query including one or more second search tokens;
   identifying a repetitive search result that is a search result in both the first set of search results and the second set of search results, wherein the repetitive search result was not selected in the first set of search results; and
   selecting a second snippet from a plurality of different snippets in content referred to by the repetitive search result wherein the second snippet is different from the identified first snippet for the repetitive search result, and wherein the second snippet is selected based at least partly on an associated weight that is determined from a location of the second snippet in content referred to by the repetitive search result.

6. The machine-readable storage device of claim 5 wherein at least one of the second search tokens from the second query is different from at every one of the first search tokens from the first query.

7. The machine-readable storage device of claim 5 wherein the first snippet is an area of text in the content referred to by the repetitive search result surrounding the one or more first search tokens.

8. A system comprising:
   a machine-readable storage device storing a program product; and
   a data processing apparatus configured to execute the program product to perform operations comprising:
      identifying a first set of search results responsive to a first query during a search session, the first query including one or more first search tokens;
      for each search result in the first set of search results, identifying a first snippet in content referred to by the search result, the first snippet selected based on a location of the one or more first search tokens of the first query in the content referred to by the search result;
      identifying a second set of search results responsive to a different second query during the search session, the second query including one or more second search tokens;
      identifying a repetitive search result that is a search result in both the first set of search results and the second set of search results, wherein the repetitive search result was not selected in the first set of search results; and
      selecting a second snippet from a plurality of different snippets in content referred to by the repetitive search result wherein the second snippet is different from the identified first snippet for the repetitive search result, and wherein the second snippet is selected based at least partly on an associated weight that is determined from a location of the second snippet in content referred to by the repetitive search result.

9. The system of claim 8, wherein at least one of the second search tokens from the second query is different from every one of the first search tokens from the first query.

10. The system of claim 8, wherein identifying a repetitive search result comprises identifying a repetitive search result that is a search result in both the first set of search results and the second set of search results where the repetitive search result was selected in the first set of search results.

11. The system of claim 8, wherein the first snippet is an area of text the content referred to by the repetitive search result surrounding the one or more first search tokens.

12. The system of claim 8 wherein the associated weight is also based on a number of the second search tokens that occur in the second snippet.

13. The machine-readable storage device of claim 5 wherein the associated weight is also based on a number of the second search tokens that occur in the second snippet.

14. The method of claim 1, further comprising providing the second snippet with the repetitive search result to a client.

15. The machine-readable storage device of claim 5, wherein the operations further comprise providing the second snippet with the repetitive search result to a client.

16. The system of claim 8, wherein the operations further comprise providing the second snippet with the repetitive search result to a client.

* * * * *

UNITED STATES PATENT AND TRADEMARK OFFICE
CERTIFICATE OF CORRECTION

| | |
|---|---|
| PATENT NO. | : 8,145,630 B1 |
| APPLICATION NO. | : 11/966613 |
| DATED | : March 27, 2012 |
| INVENTOR(S) | : Ashutosh Garg |

It is certified that error appears in the above-identified patent and that said Letters Patent is hereby corrected as shown below:

In Claim 2, at column 11, line 48, before "one" insert -- every --.
In Claim 4, at column 11, line 53, delete "1;" and insert -- 1 --, therefor.
In Claim 6, at column 12, line 20, after "from" delete "at".

Signed and Sealed this
Third Day of July, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,145,630 B1 | Page 1 of 1 |
| APPLICATION NO. | : 11/966613 | |
| DATED | : March 27, 2012 | |
| INVENTOR(S) | : Garg et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 260 days.

Signed and Sealed this
Fourteenth Day of August, 2012

David J. Kappos
*Director of the United States Patent and Trademark Office*